(12) United States Patent
Bean

(10) Patent No.: US 11,168,601 B2
(45) Date of Patent: Nov. 9, 2021

(54) CLAMPING APPARATUS AND METHOD OF USE THEREOF

(71) Applicant: Teconnex Ltd, Keighley Yorkshire (GB)

(72) Inventor: Darren Bean, Keighley (GB)

(73) Assignee: TECONNEX LTD., Keighley Yorkshire (GB)

( * ) Notice: Subject to any disclaimer, the term of this patent is extended or adjusted under 35 U.S.C. 154(b) by 243 days.

(21) Appl. No.: 16/495,899

(22) PCT Filed: Mar. 21, 2018

(86) PCT No.: PCT/GB2018/050734
§ 371 (c)(1),
(2) Date: Sep. 20, 2019

(87) PCT Pub. No.: WO2018/172769
PCT Pub. Date: Sep. 27, 2018

(65) Prior Publication Data
US 2020/0032695 A1  Jan. 30, 2020

(30) Foreign Application Priority Data
Mar. 22, 2017  (GB) ..................................... 1704520

(51) Int. Cl.
*F01N 13/00* (2010.01)
*F01N 13/18* (2010.01)
(Continued)

(52) U.S. Cl.
CPC ....... *F01N 13/008* (2013.01); *F01N 13/1827* (2013.01); *F01N 13/1855* (2013.01);
(Continued)

(58) Field of Classification Search
CPC .............. F01N 13/008; F01N 13/1827; F01N 13/1855; F01N 2450/18; F01N 2450/16; F01N 2610/148; F01N 2450/20
(Continued)

(56) References Cited

U.S. PATENT DOCUMENTS 10,935,172 B2 *  3/2021  Ignaczak ................. F16L 23/08
2006/0067860 A1  3/2006  Faircloth et al.
(Continued)

FOREIGN PATENT DOCUMENTS

| EP | 2 700 862 | 2/2014 |
|---|---|---|
| JP | 2002 071067 | 3/2002 |
| KR | 101 583 597 | 1/2016 |

*Primary Examiner* — Tom P Duong
(74) *Attorney, Agent, or Firm* — Woodard, Emhardt, Henry, Reeves & Wagner LLP

(57) ABSTRACT

Clamping apparatus is provided including clamp means for clamping two or more items together in use. The clamping means are arranged to move between a clamped and an unclamped position in use. Attachment means are provided on or associated with the clamping means for attaching one or more components to said clamping means in use. The components consist of any or any combination of one or more sensor means, one or more dispensing means or one or more electronic components. The clamping means includes at least one band member. The at least one band member forms an outer band and the attachment means are provided on or associated with at least an additional band member in the form of an inner band or segment that is provided with or associated with the outer band.

15 Claims, 9 Drawing Sheets

(51) Int. Cl.
*F16L 23/08* (2006.01)
*F16L 41/00* (2006.01)

(52) U.S. Cl.
CPC ...... *F01N 2450/16* (2013.01); *F01N 2450/18* (2013.01); *F16L 23/08* (2013.01); *F16L 41/008* (2013.01)

(58) Field of Classification Search
USPC ........................................................ 285/420
See application file for complete search history.

(56) References Cited

U.S. PATENT DOCUMENTS

| | | | |
|---|---|---|---|
| 2007/0169452 A1* | 7/2007 | Grimm | F01N 3/0211 55/523 |
| 2008/0136117 A1* | 6/2008 | Roe | F01N 13/1827 277/530 |
| 2010/0126127 A1* | 5/2010 | Franken | F01N 13/185 55/493 |
| 2011/0023452 A1 | 2/2011 | Gisslen et al. | |
| 2012/0018999 A1 | 1/2012 | Geese et al. | |
| 2012/0210982 A1 | 8/2012 | Reba | |
| 2015/0300233 A1* | 10/2015 | Bowers | F01N 13/008 60/320 |
| 2016/0053663 A1* | 2/2016 | Davison | F01N 13/1822 60/301 |
| 2016/0061090 A1* | 3/2016 | Anand | F01N 3/035 60/297 |
| 2016/0076430 A1* | 3/2016 | Freeman | F01N 13/1844 60/301 |
| 2017/0009638 A1* | 1/2017 | Suetou | F01N 13/18 |

\* cited by examiner

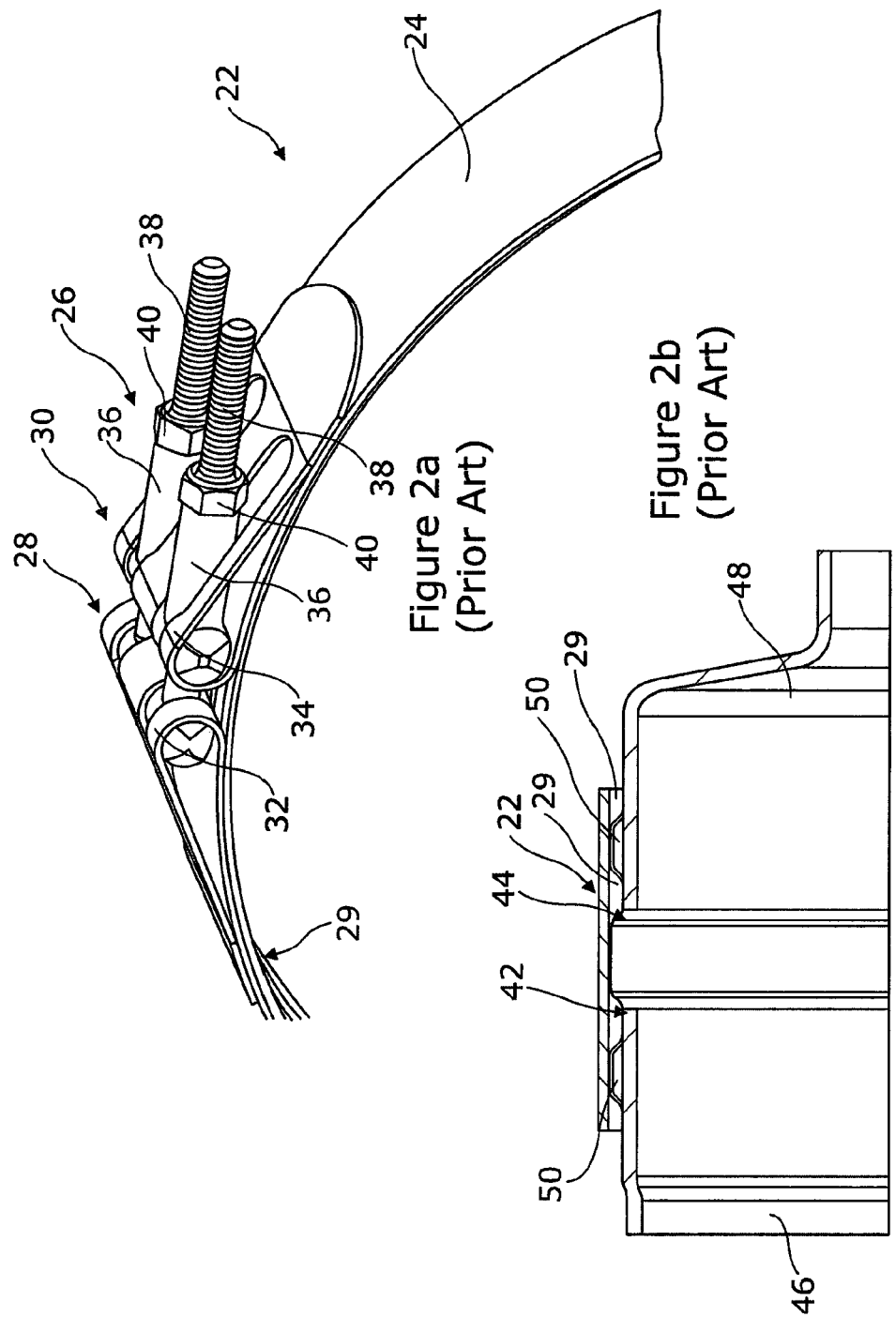

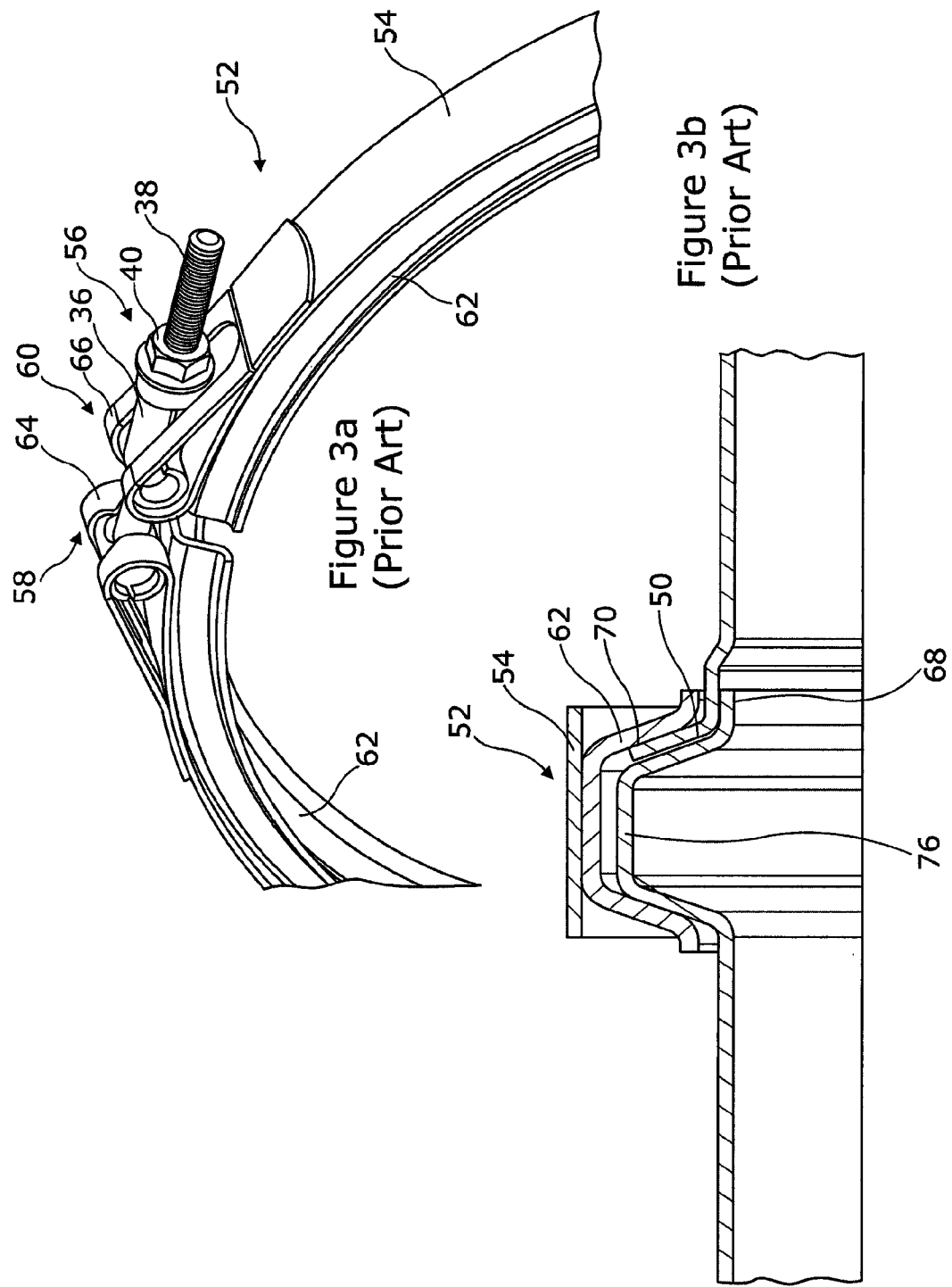

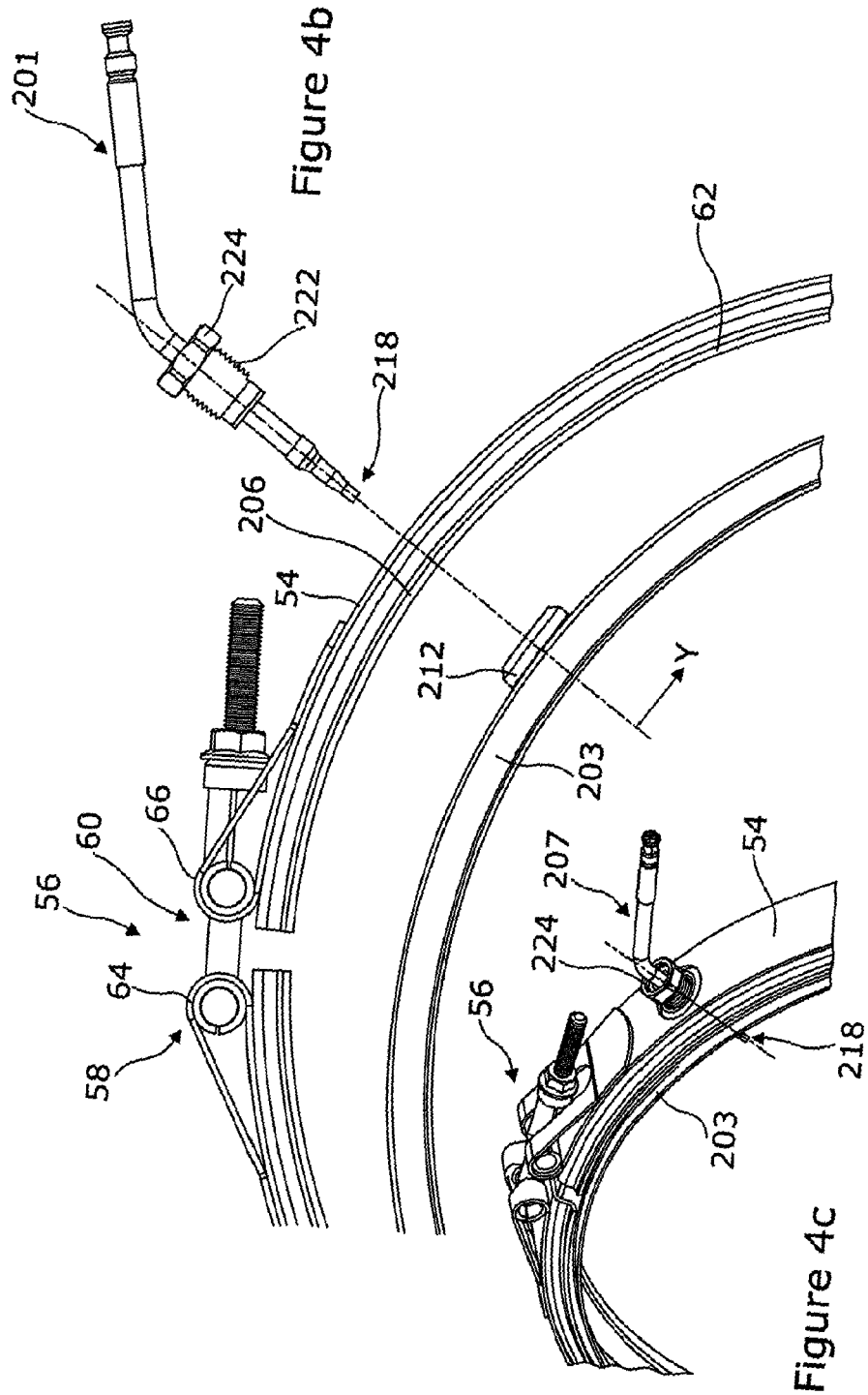

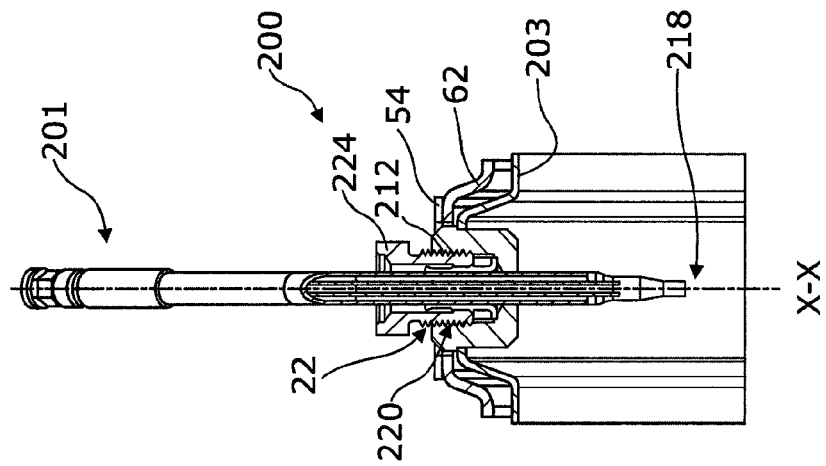
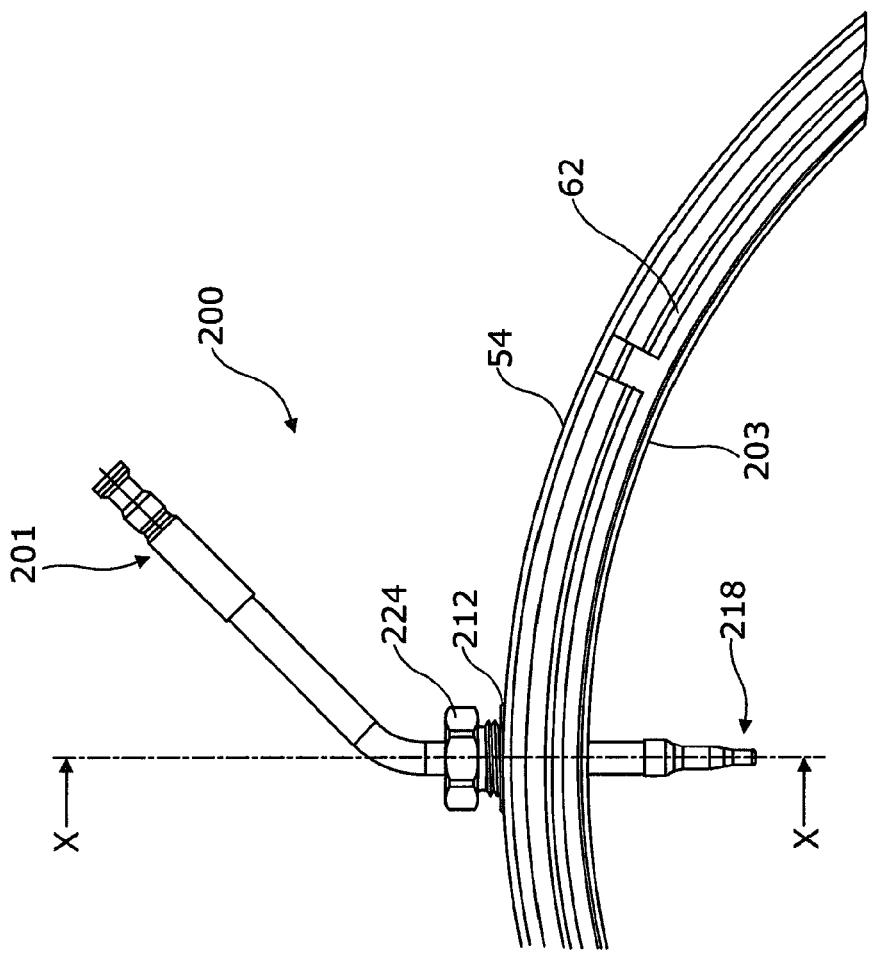

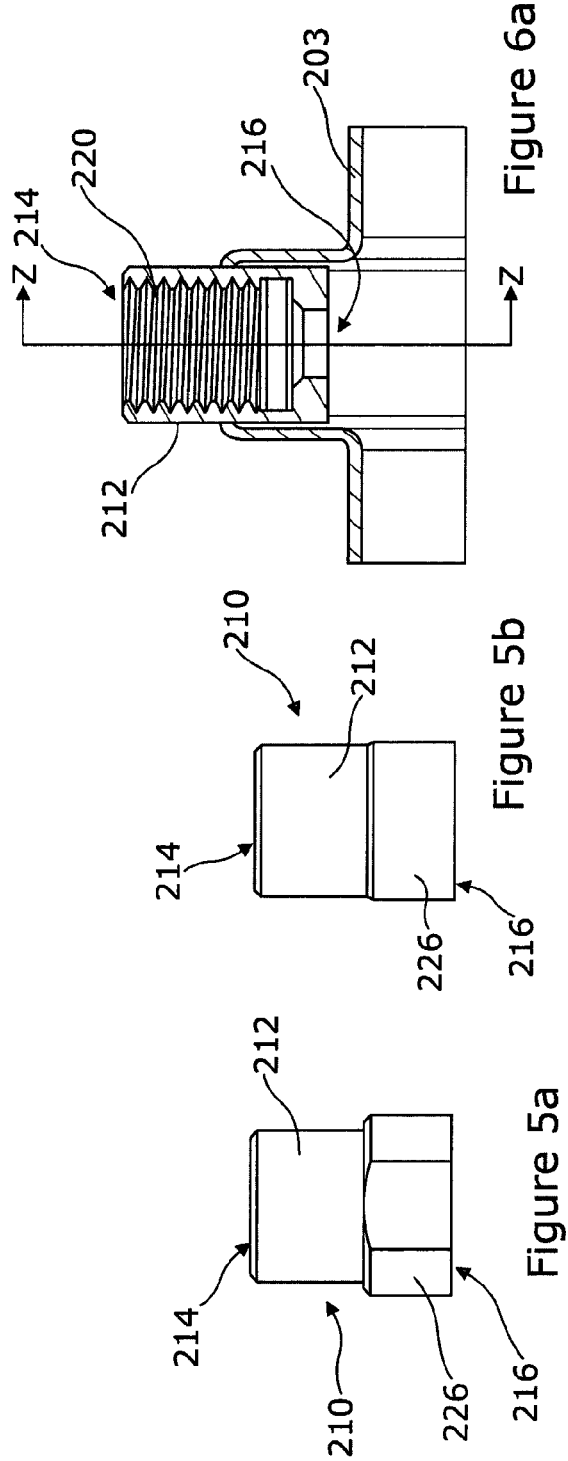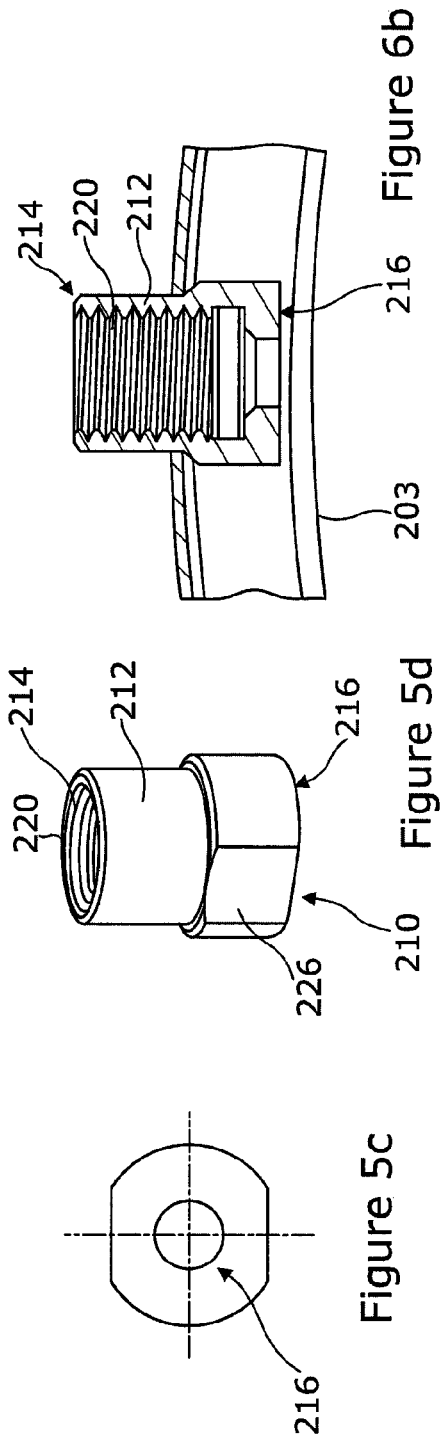

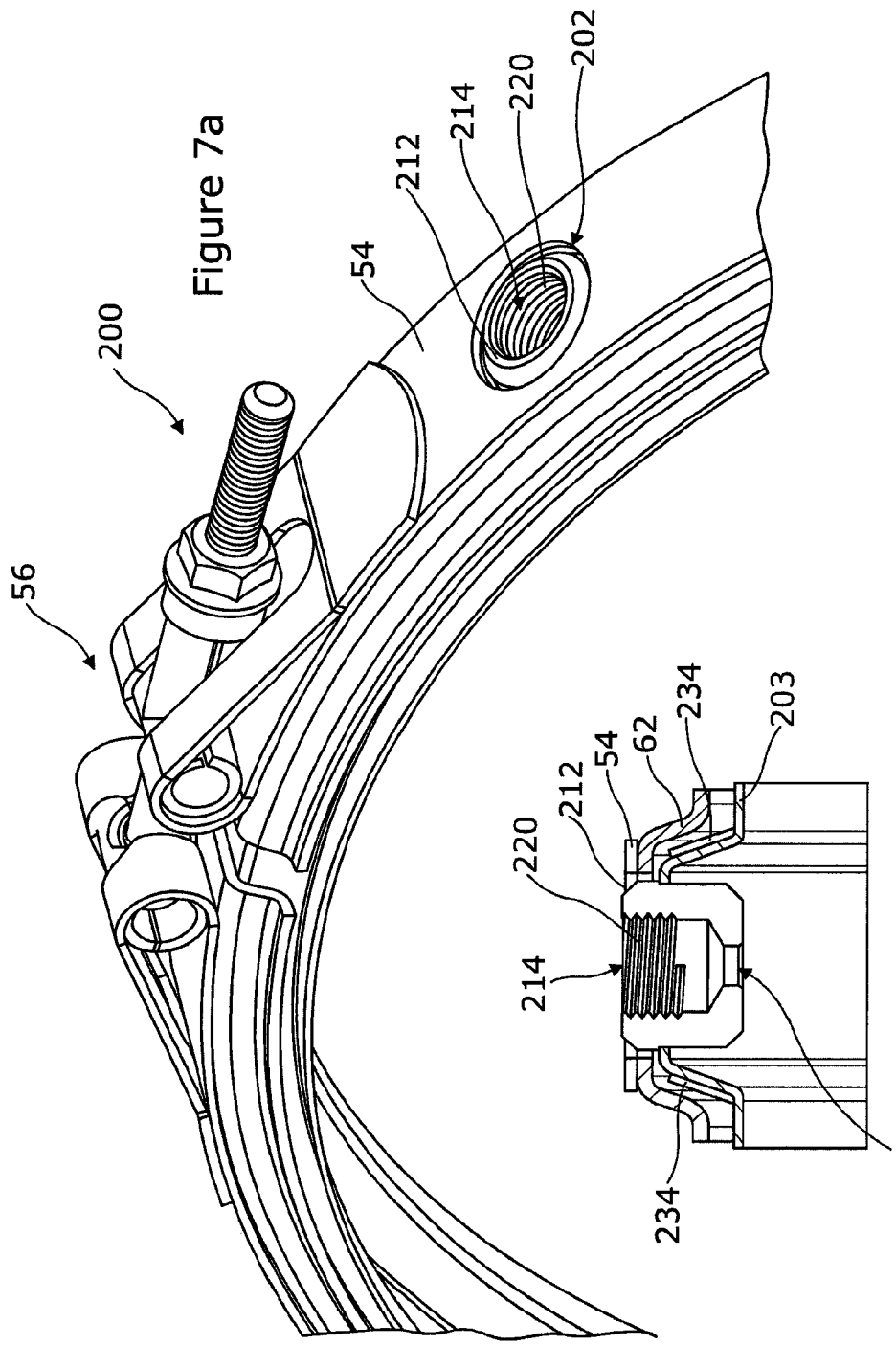

CLAMPING APPARATUS AND METHOD OF USE THEREOF

This invention relates to clamping apparatus and to a method of use thereof.

Although the following description refers almost exclusively to clamping apparatus in the form of a V-clamp for clamping together the ends of two conduits or cans for use in an exhaust system, it will be appreciated by persons skilled in the art that the clamping apparatus of the present invention could be used for any application.

A conventional exhaust ATS (after treatment system) typically comprises a plurality of filter sections to filter exhaust gases being released from a combustion engine. An example of the filter sections that might be present in an exhaust ATS include a diesel oxidation catalyst (DOC) filter section, a diesel particulate filter (DPF) section, a selective catalytic reduction (SCR) filter section and/or the like. These filter sections are designed to remove particulate matter from the exhaust gas, convert exhaust pollutants such as carbon monoxide, gas phase hydrocarbons and/or the like into harmless substances such as carbon dioxide and water, convert nitrogen oxides into nitrogen gas and water, and/or the like.

The filter sections are each typically surrounded by a steel can, and the steel cans are clamped together in a suitable end to end arrangement using clamping apparatus. Each filter sections is typically independently arranged within the exhaust system such that each section can be independently serviced, replaced and/or repaired. Within or between each filter section, it is known to include sensors to monitor the exhaust ATS. For example, pressure sensors, temperature sensors, nitrogen oxide (NOX) sensors and/or the like can be provided. The sensors are typically located through the exterior steel can so as to protrude into the flow of exhaust gases travelling through the filter sections in use. They can be fitted using a screw fit fixing, a push fit fixing, a bayonet type fixing and/or the like.

An example of a conventional exhaust ATS 2 is shown in FIG. 1. The ATS 2 comprises a DPF section 4 and a SCR section 6. A clamp 8 is provided to join adjacent ends of the DPF and SCR sections together. Further clamps 10, 12 are provided to join a DOC filter section 14 to an end of DPF section 4, and to join an outlet conduit 16 to an end of SCR section 6 respectively. Sensors 18, 20 are provided in filter sections 14 and 16 respectively to monitor one or more parameters of the exhaust gas cleaning process.

One example of a clamp that can be used to clamp together one or more filter sections and/or conduits is a flat band clamp 22, as shown in FIG. 2a. The clamp 22 comprises a flat, continuous outer annular band 24 with a closure mechanism 26 provided between the two opposing ends 28, 30 of the band 24. Each end 28, 30 is provided with a strap 32, 34 respectively and trunnion attachments 36 are provided between straps 32, 34. The trunnion attachment 36 includes a threaded bolt 38 and an adjustable nut 40 for adjusting the clamping force applied between the two ends 28, 30 of the band, thereby allowing the clamp 22 to be moved between a clamped position, wherein the ends 28, 30 of the band 24 are relatively close to each other and a clamping force can be applied by the same, and an unclamped position, wherein the ends 28, 30 of the band 24 are relatively far apart from each other and the items to be clamped can be inserted and/or removed from the clamp. An inner liner member 29 can be fixed to the inwardly facing surface of the outer annular band 24. The inner liner member 29 can be profiled if required.

FIG. 2b shows how the clamp 22 can be located in overlapping relationship around the exterior surface adjacent two opposing ends 42, 44 of two conduits 46, 48 to join the conduit ends together in use. Sealing means in the form of one or more sealing gaskets 50 can be provided between the inner liner member 29 of the clamp 22 and the exterior surfaces of the conduits 46, 48 to seal the conduit ends.

Another example of a clamp that can be used to clamp together one or more filter sections and/or conduits is a V-band clamp 52, as shown in FIG. 3a. The clamp 52 comprises flat continuous outer annular band 54 with a closure mechanism 56 provided between the two opposing ends 58, 60 of the band 54. An inner profiled band is joined to the inwardly facing surface of the outer annular band and comprises a plurality of V-shaped profiled segments 62. Each end 58, 60 of the outer band 54 is provided with a strap 64, 66 respectively and trunnion attachment 36 is provided between straps 64, 66. The trunnion attachment 36 includes a threaded bolt 38 and an adjustable nut 40 for adjusting the clamping force applied between the two ends 58, 60 of the band, thereby allowing the clamp 52 to be moved between a clamped position, wherein the ends 58, 60 of the band 54 are relatively close to each other and a clamping force can be applied by the same, and an unclamped position, wherein the ends 58, 60 of the band 54 are relatively far apart from each other and the items to be clamped can be inserted with and/or removed from the clamp.

FIG. 3b shows how the clamp 52 can be located in overlapping relationship around the exterior surface adjacent two opposing ends 68, 70 of two conduits 72, 74 to join/clamp the conduit ends together in use. Conduit 72 has an outward protrusion or bubble 76 adjacent to end 68 but a small spaced distance therefrom, and conduit 74 is outwardly flared at end 70. Sealing means in the form of one or more sealing gaskets 50 can be provided between an interior surface of the flared end 70 and the exterior surface of end 68 of conduit 72, to seal the conduit ends.

A problem associated with the above type of exhaust ATS arrangement is that the space available to fit all the filter sections to provide adequate after treatment processing/cleaning g of the exhaust gases, together with the sensors and the clamps, is limited. There is therefore a requirement to produce exhaust ATS arrangements that have reduced dimensions and/or which take up less space.

US20110023452 discloses apparatus for treating an exhaust gas stream and having removable filter modules. The apparatus comprises a housing having fixed boundaries between an inlet and an outlet to the housing. At least two filter sections are arranged within the housing and define an interior exhaust passage where one or more treatments are performed on the gas flowing through the same in use. At least one of the sections is removable from the housing in a direction perpendicular to the gas flow direction. A first releasable clamp is secured at a first end of the removable section and a second releasable clamp is secured at a second end of the removable section. In a clamped position the second end is separated from the second adjacent filter section by a tolerance gap and the second clamp forms a seal between the two ends of the filter sections without the use of a gasket. The second clamp is a flat band clamp with a width sufficient to cover the tolerance gap. A sensor can be provided and is arranged to extend into the tolerance gap and can be provided on or adjacent the second flat band clamp. A problem with this system is that the use is limited to this specific application whereby the filter sections are contained within a fixed housing and there has to be a tolerance gap between the sections being joined together. In addition, this system is limited for use with a flat band clamp.

It is therefore an aim of the present invention to provide clamping apparatus that overcomes the abovementioned problems and that can be used with a much wider range of systems and applications.

It is a further aim of the present invention to provide a method of using clamping apparatus that overcomes the abovementioned problems and that can be used with a much wider range of systems and applications.

According to a first aspect of the present invention there is provided clamping apparatus, said clamping apparatus including clamp means for clamping two or more items together in use, said clamping means arranged to move between a clamped position and an unclamped position in use, and wherein attachment means are provided on or associated with the clamping means for attaching one or more components to said clamping means in use, said components consisting of any or any combination of one or more sensor means, one or more dispensing means or one or more electronic components, the clamping means including at least one band or strap member, characterised in that the attachment means are provided on or associated with at least one additional band or strap member, or band or strap segment.

Thus, the present applicants have found that by combining and/or associating one or more sensor means, dispensing means, electronic components and/or attachment means for any of the aforementioned components, with the clamping apparatus, this significantly saves the space taken up by the apparatus. This allows for a more compact design to be provided and/or allows at least one of the two or more items being clamped together to be relatively larger in dimensions than if the clamping apparatus of the present invention was not used, while taking up the same, substantially the same, or less space.

The inclusion of one or more sensor means, dispensing means, electronic components and/or attachment means for any of the aforementioned components with the clamping apparatus is unexpected and contrary to what a skilled person would normally consider. Conventionally it has always been thought to be essential for the clamping means to have continuity of form between the two clamping ends, at least in the outer strap or band of the clamp, and to have no disruptions or obstructions associated with the same that could reduce the strength and integrity of the clamping means and/or the clamping force that could be applied by the clamping means. However, the Applicants have unexpectedly found that the abovementioned components can be provided on or associated with the clamping apparatus without significantly reducing the strength and clamping efficiency of the same, thereby providing a surprising benefit.

In addition, since the attachment means for the one or more components are provided on or associated with an additional band member or strap, or segment member or strap, the present invention can be used for applications where a tolerance gap is provided between the two items being joined but also where no tolerance gap is provided between the two items being joined. Thus, the present invention can provide a structural join retaining the two items being joined together and/or in abutting or overlapping relationship with each other. This allows the present invention to have a much wider application than with the prior art systems.

Furthermore, since the attachment means of the present invention can be provided on or associated with the additional band member or strap, or segment member or strap, this increases the ease and cost of manufacture of the same and does not require the at least one band member to be compromised, or compromised to the same degree, compared to where attachment means are provided solely with the at least one band or strap member.

The clamping apparatus of the present invention is self-aligning in a linear axis or in an axis parallel to the longitudinal axis of the two items being joined together. This is not possible in the prior art system where an additional mechanical device or guide would typically be required to ensure the clamp apparatus was located centrally over the gap between connecting pipes or filter sections.

Preferably the at least one band or strap member is an outer or outermost band or strap member and the at least additional band or strap member, or band or strap segment, is an inner or innermost band or strap member, or inner or innermost band or strap segment.

Preferably the at least one band or strap member is movable between the clamped and unclamped positions in use.

Preferably the at least one band or strap member is annular or substantially annular in form.

In one embodiment the at least one band or strap member includes an outer or outermost band member and two or more segment members joined on an inwardly facing surface of the outer or outermost band member. The two or more segment members are preferably in addition to the at least one additional band or strap member, or band or strap member segments.

In one embodiment the at least one band or strap member includes two bands or strap members joined together. the two bands or strap members are preferably in addition to the at least one additional band or strap member, or band or strap member segments.

Preferably the two or more segment members are arranged in an end to end manner either in abutting relationship or a spaced distance apart from each other.

Preferably the at least one additional band member or strap member is annular or substantially annular in form.

Preferably the at least one additional band member or strap member, or band segment or strap segment, is curved or substantially curved in form.

In one embodiment the at least one additional band or strap member is continuous or substantially continuous in form.

In one embodiment a plurality of the additional band segments or strap segments are joined together in an end to end manner to form an annular or substantially annular member.

In one embodiment the at least one additional band or strap member, or band or strap segment, is arranged to be joined to or in abutting relationship with the at least one band member in use.

In one embodiment the ends of the two or more items being joined together via the clamping apparatus are in abutting or overlapping relationship with each other in use.

In one embodiment the opposing ends of the two or more items being joined together via the clamping apparatus are a spaced distance apart and/or have a tolerance gap between the same in use.

In one embodiment the at least one band member is profiled, non-planar and/or has one or more angled surfaces when viewed in cross section (i.e. from side to side edge), such as for example a V-shaped, substantially V-shaped, U-shaped or substantially U-shaped profile or cross section.

In one embodiment the at least one additional band or strap member, or band or strap segment, is profiled, non-planar and/or has one or more angled surfaces when viewed in cross section (i.e. from side to side edge), such as for example a V-shaped, substantially V-shaped, U-shaped or substantially U-shaped profile.

Preferably the at least one additional band or strap member is complementary or substantially complementary in profile and/or shape to the at least one band or strap member.

In one embodiment attachment means are also provided on or associated with the at least one band or strap member.

Preferably the location and/or removal of the one or more components with the clamping apparatus can be undertaken independently of clamping of the clamping apparatus with the two or more items in use.

In one embodiment the attachment means of the at least one band or strap member and/or the at least one additional band or strap member, or band or strap segment, is any attachment mechanism for allowing a component to be attached to the same in use. For example, the attachment means could include any or any combination of one or more apertures, sockets, slots, screw threaded attachments, one or more nuts, bolts, clips, inter-engaging members, welding, adhesive, friction fit, bayonet fitting, push fit connection and/or the like.

Preferably the at least one additional band or strap member, or band or strap segment, is located or associated with an inwardly facing surface of the clamping means and/or between an outer surface of the two items being clamped together and s surface of the clamping means facing towards the items in use.

In one embodiment the at least one additional band or strap member, or band or strap segment, is located with the two items being clamped independently or separately of the at least one band or strap member.

In one embodiment the at least one additional band or strap member, or band or strap segment, is located with the two items being clamped simultaneously or substantially simultaneously to the at least one band or strap member.

Preferably the attachment means is provided on or associated with the at least one additional band or strap member, the band or strap segment and/or the at least one band member a spaced distance apart from one or more peripheral edges of the same, and further preferably is provided a spaced distance from all peripheral edges or side edges of the same. Thus, in one example, the attachment means is located in or on a surface of the at least one additional band or strap member, the band or strap segment and/or the at least one band member within the peripheral boundaries of the same. This helps to maintain the strength and integrity of the clamping apparatus in use.

Preferably the attachment means are provided on or associated with the at least one additional band or strap member, the band or strap segment and/or the at least one band member a spaced distance from one or more ends or opposing ends of the same.

In one embodiment the attachment means includes first attachment means for attaching a component location means or member to the at least one additional band or strap member, the band or strap segment and/or the at least one band member.

Preferably the attachment means includes second attachment means for attaching the one or more components to the component location means or member.

Preferably the first and/or the second attachment means include any or any combination of one or more apertures, sockets, slots, screw threaded attachments, one or more nuts, bolts, clips, inter-engaging members, welding, adhesive, friction fit, bayonet fitting, push fit connection, complementary screw thread arrangements and/or the like.

In one embodiment the component location means or member is in the form of a socket or sleeve member.

The component location means, socket or sleeve member can be integral with, fixedly attached or detachably attached to the at least one additional band or strap member, the band or strap segment and/or the at least one band member.

Preferably the component location means, socket or sleeve member has a channel defined therein or therethrough, and further preferably has a channel passing between first and second parts or ends of the same.

Preferably at least an interior surface of the component location means, socket or sleeve member defining the channel is provided with screw threads on the same for engaging with complementary screw threads provided on an external surface of the component and/or second attachment means.

In one embodiment the second attachment means are attached, detachably attached or integral with the component.

In one embodiment at least part of an exterior surface of the component location means, socket or sleeve member is provided with screws threads thereon for engaging with complementary screw threads provided on a locking nut. A part or surface of the at least one additional band or strap member, or band or strap segment, is typically located between the component, location means, socket or sleeve member and the locking nut in use and is held in place between the same.

In one embodiment at least part of the component location means, socket or sleeve member and/or attachment means protrudes outwardly from an outer or outwardly facing surface of the at least one additional band or strap member, or band or strap segment, and/or at least one band member in use. However, an end of the component location means, socket or sleeve member and/or attachment means could be flush with, substantially flush with or recessed with respect to the outer or outwardly facing surface of the at least one additional band or strap member, or band or strap segment, and/or at least one band member in use.

In one embodiment a first part or end of the attachment means, first attachment means, component location means, socket or sleeve member is provided with one or more larger dimensions than a second end or part of the same, thereby preventing the first part or from passing all the way through an aperture defined in the at least one additional band or strap member, band or strap segment and/or at least one band member in use. The second end or part is typically dimensioned such that it can pass through the aperture in use.

Preferably the attachment means, first attachment means, component location means, socket or sleeve member has a narrowing taper from the first part or end towards the second part or end thereof. Alternatively, the the attachment means, first attachment means, component location means, socket or sleeve member can have a step or shoulder portion between the larger dimensions or width of the first part or end relative to the smaller dimensions or width of the second part or end.

Preferably the first end or part having the one or more larger dimensions or width is in the form of an outwardly protruding flange or skirt portion.

Preferably the flange or skirt portion engages against an inwardly facing surface of the at least one additional band or strap member, band or strap segment and/or at least one band member in use.

Preferably one or more portions or ends of the at least one band member are relatively close together when in a clamped position, thereby allowing two or more items to be clamped together in use, and said one or more portions or ends are relatively spaced apart from each other when in an unclamped position, thereby allowing two or more items to be brought together and/or moved apart from each other in use.

In one embodiment at least part of the surface of the at least one additional band or strap member, or band or strap segment, adjacent or immediately adjacent the component location means, socket or sleeve member is perpendicular or substantially perpendicular thereto.

In one embodiment at least part of the surface of the at least one additional band or strap member, or band or strap segment, adjacent or immediately adjacent the component location means, socket or sleeve member is at an acute angle therewith.

Preferably the clamping means is in the form of a V-band clamp, a profiled band clamp and/or the like.

In one embodiment securing means are provided on or associated with the clamping means or at least one band or strap member for maintaining the same in the clamped and/or unclamped positions in use and/or for adjusting the clamping force applied by the clamping means or at least one band or strap member in use.

Preferably the securing means includes any or any combination of one or more nuts and bolts, screws, trunnions, clips, inter-engaging members and/or the like.

Preferably sealing means or one or more sealing members are provided with or associated with the one or more clamping apparatus to form a seal on or between the one or more components, the at least one band or strap member, the at least one additional band or strap member, or band or strap segment and/or the one or more items on which the clamping apparatus is to be used.

In one embodiment the sealing means or one or more sealing members can include one or more sealing rings, gaskets, trapezoid gaskets, flat gaskets, washers and/or the like.

In one embodiment the one or more sensor means can include any sensing device that allows one or more parameters to be sensed or measured in use. Preferably the one or more parameters being measured or sensed relate to the two or more items being clamped together; relate to one or more components, fluids, gases and/or liquids located in or flowing through the two or more items being clamped together in use and/or the like.

In one embodiment the one or more sensor means can include any or any combination of one or more pressure sensors, temperature sensors, nitrogen oxide sensors, oxygen sensors, lambda sensors, diesel particulate sensor, and/or the like.

In one embodiment two or more components are provided in or associated with clamping means.

In one embodiment the dispensing means can include any device that allows dispensing of one or more gases, liquids, fluids and/or solids therefrom in use.

Preferably the dispensing means includes one or more injection devices for injecting one or more gases, liquids, fluids and/or solids therefrom in use. For example, the dispensing means could include one or more urea injection devices.

In one embodiment the one or more electronic components can include one or more heating devices, heating elements, heating means and/or the like.

Preferably the one or more items being joined together by the clamping apparatus include any or any combination of one or more conduits, flared end conduits, flat end conduits, pipes, hoses, filter sections, cans and/or the like.

Preferably the one or more components can be attached or detachably attached with the component attachment means independently of the attachment of the component attachment means with the clamping apparatus in use.

In one embodiment closure means can be provided for closing an opening, aperture and/or the like associated with the attachment means, component location means and/or the like. The closure means can be used when a component is not required to be located with the clamping apparatus in use.

The closure means can include any or any combination of a bung, lid, valve, stop, cover and/or the like.

According to a second aspect of the present invention there is provided a method of using clamping apparatus, said clamping apparatus including clamp means and said method including the steps of locating said clamp means around two or more items that need to be clamped together, moving said clamping means from an unclamped position to an clamped position, attaching one or more components to said clamping means using attachment means, wherein said components consist of any or any combination of one or more sensors, one or more dispensing means or one or more electronic components, the clamping means including at least one band or strap member, characterised in that the attachment means are provided on or associated with at least one additional band or strap member, or band or strap segment.

Preferably the additional band or strap members, or band or strap segments, are located on one or more of the items to be clamped together first prior to location of the at least one band or strap member.

According to further independent aspects of the present invention there is provided combined clamping and sensor apparatus; and a method of using the same.

Embodiments of the present invention will now be described with reference to the following figures, wherein:

FIG. 2a (Prior Art) is a partial perspective view of a flat band clamp;

FIG. 2b (Prior Art) is a cross sectional view taken through two conduits joined together via the flat band clamp in FIG. 2a;

FIG. 3a (Prior Art) is a partial perspective view of a V-clamp;

FIG. 3b (Prior Art) is a cross sectional view taken through two conduits joined together via the V-clamp in FIG. 3a;

FIG. 4b shows a partial side view of the V-band clamp and sensor means in FIG. 4a;

FIG. 4c shows a partial perspective view of the V-band clamp in FIG. 4a with the sensor means fitted with the clamp;

FIG. 4d shows an enlarged side view of the V-band clamp and sensor means in FIG. 4b;

FIG. 4e is a cross sectional view taken along line X-X of FIG. 4d;

FIGS. 5a-5d show a side view, a front view, a base plan view and a perspective view respectively of a sensor attachment socket according to one embodiment of the present invention;

FIGS. 6a and 6b are cross sectional views of the sensor attachment socket taken along lines Y-Y in FIG. 4b and lines Z-Z in FIG. 4a respectively;

FIG. 7a show a perspective view of the sensor attachment socket joined to the clamp in FIGS. 4a-4e in an installed arrangement without the sensor shown in one embodiment of the present invention;

FIG. 7b shows a cross sectional view taken through the sensor socket of the clamp in FIG. 7a;

Figure 1:
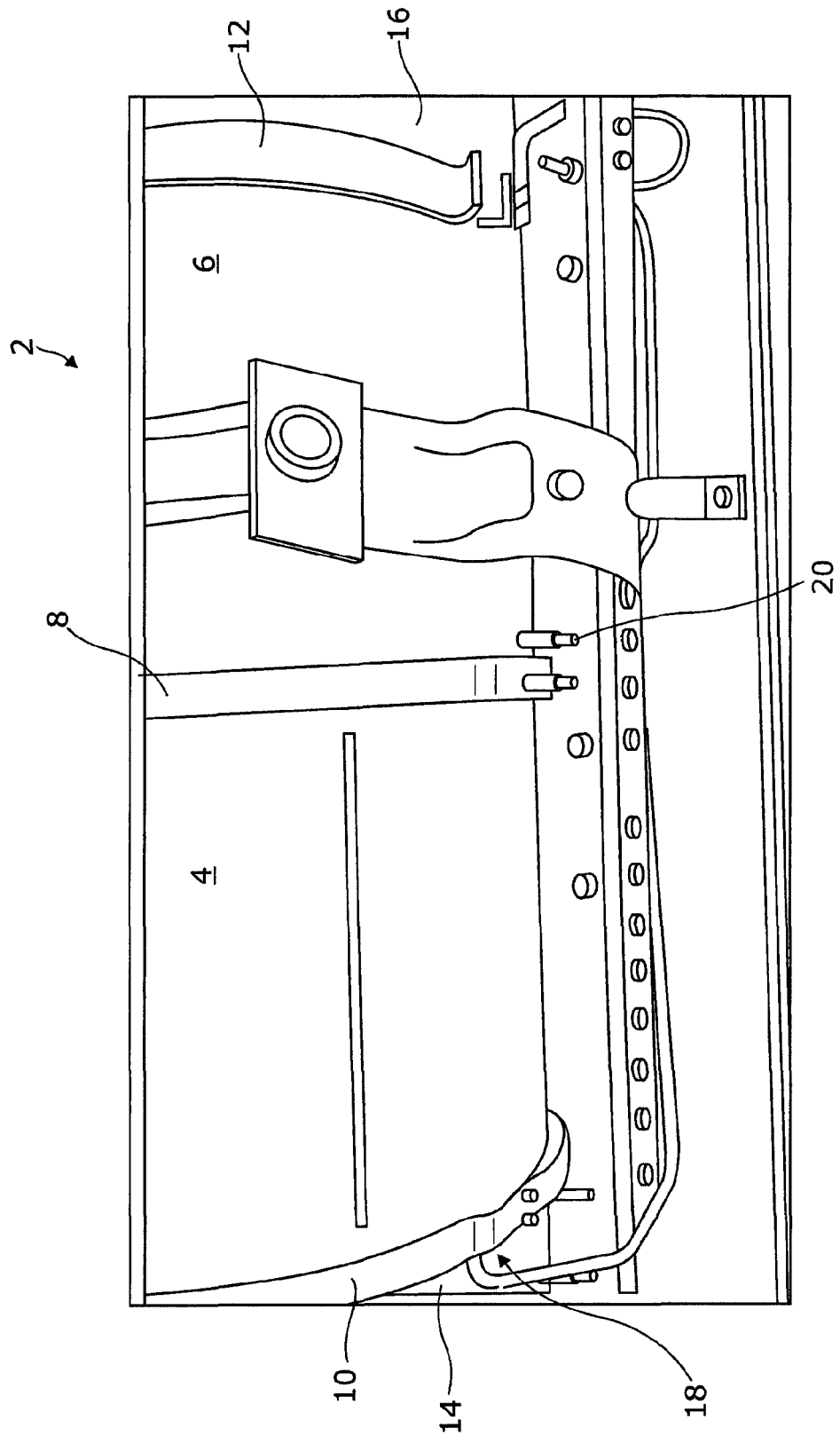
FIG. 1 (Prior Art) shows an example of filter sections used in an exhaust after treatment system.
Figure 4A:
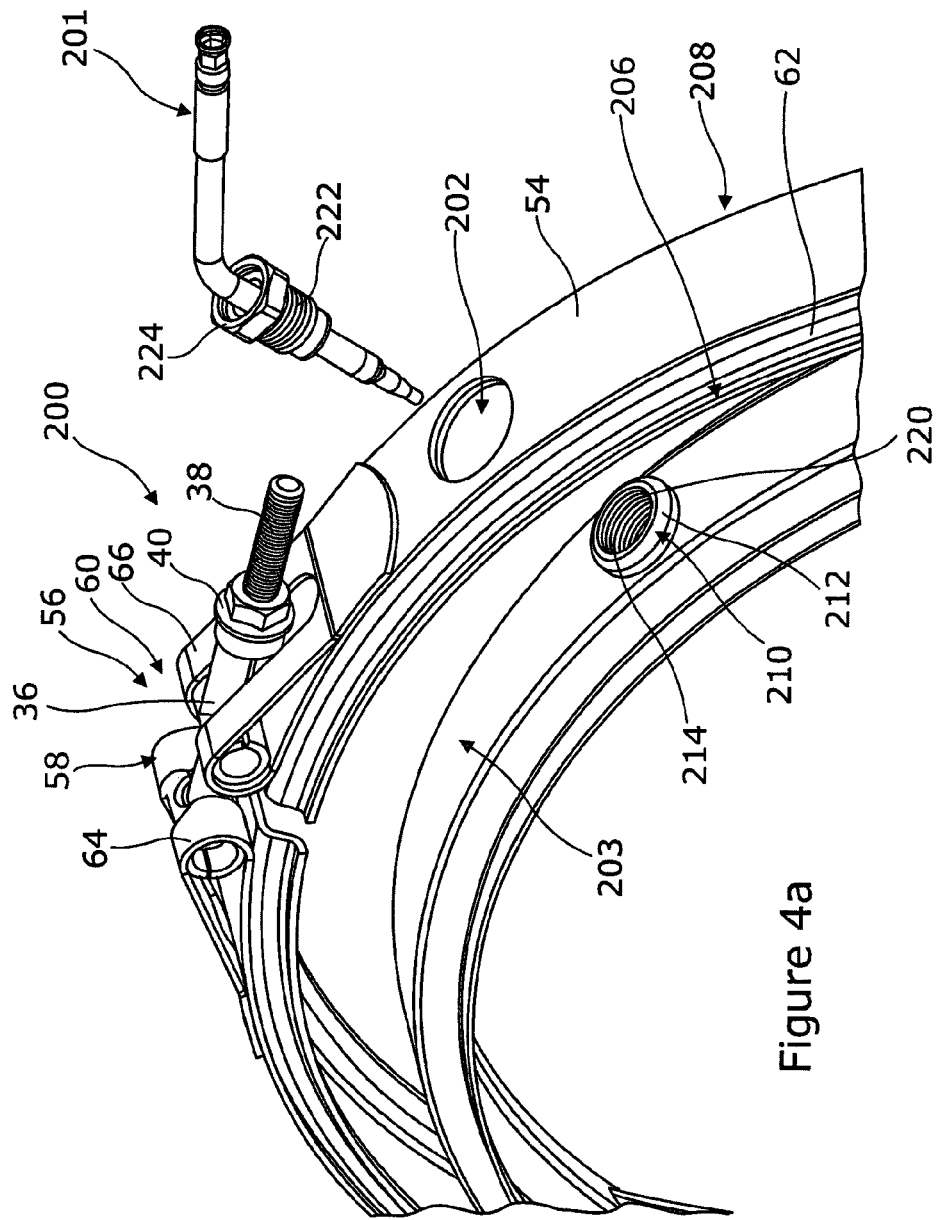
FIG. 4a shows a partial perspective view of a V-band clamp including a partially exploded view of sensor means according to an embodiment of the present invention.
Figure 8:
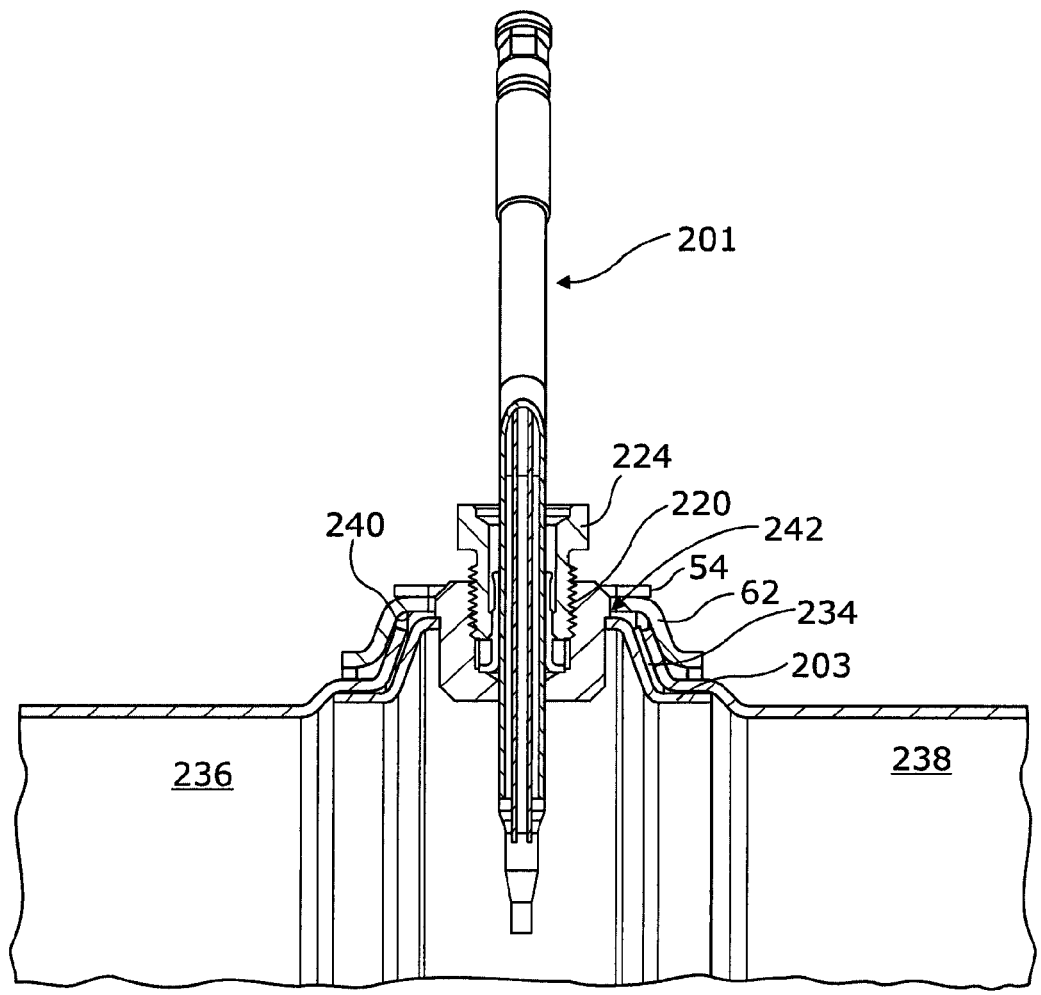

FIG. 8 is a cross sectional view taken through the clamping arrangement of FIGS. 4a-4e when joined to two pipes in one embodiment of the present invention; and Referring to FIGS. 4a-4e, there is illustrated clamping apparatus in the form of a V-band clamp 200 according to an embodiment of the present invention for securing together two filter sections of an exhaust ATS in use. The V-band clamp 200 shares many of the same features of the conventional V-band clamp shown in FIGS. 3a and 3b. As such, the same reference numerals have been used to refer to the same features as in FIGS. 3a and 3b.

In accordance with the present invention, V-band clamp 200 incorporates sensor means, which in this example is shown as a sensor 201. As the sensor is incorporated within the structure and outer boundaries (or at least between the side edges and ends) of the V-clamp 200, this reduces the space taken up by the clamp and sensor compared to conventional arrangements where the clamp and sensor are provided separately.

The clamp 200 comprises an outer flat, annular band 54 with a closure mechanism 56 provided between the two opposing ends 58, 60 of the band 54. An inner band is joined to the outer band 54 and comprises a plurality of V-shaped profiled segments 62. Each end 58, 60 of the outer band 54 is provided with a strap 64, 66 respectively and securing means in the form of trunnion attachment 36 is provided between straps 64, 66. The trunnion attachment 36 includes a threaded bolt 38 and an adjustable nut 40 for adjusting the clamping force applied between the two ends 58, 60 of the band, thereby allowing the clamp 200 to be moved between a clamped position, wherein the ends 58, 60 of the band are relatively close to each other, and an unclamped position, wherein the ends 58, 60 of the band are relatively far apart from each other.

The inner annular band member segments 62 are arranged a spaced distance apart from each other and joined in overlapping relationship with the outer annular band member 54 in use.

In accordance with the present invention, an additional inner or innermost band member 203 is provided for use with the outer band member 54 and inner segments 62. In the illustration the additional band member 203 is continuous in form and is annular. Attachment means including a sensor location socket 210, are attached to or integral with the additional inner band member 203. Sensor attachment means also includes apertures 202 defined in the outer annular band member 54 and the inner annular band segment 62. The apertures 202 are aligned in use so as to form a single resulting aperture.

It is to be noted that the apertures 202 are a spaced distance apart from the side edges 206, 208 of the clamp 200 and are entirely surrounded by a band member surface, thereby maintaining the structural integrity of the bands in use. However, the apertures could be located adjacent to or opening into the side edge or edges of the band clamp if required.

The apertures 202 break up the continuity of the band members 54, 62 or provide non-continuity of the band members.

In the embodiment shown, the sensor attachment means are arranged so as to allow detachable attachment of the sensor 201 to the sensor location socket 210 in use. However, the components of the attachment means in this embodiment are fixedly joined to the inner band member 203. More particularly, sensor location socket 210 is welded to the outwardly facing surface of the inner band member 203 in such a position that a sleeve member 212 forming part of the sensor location socket 210 protrudes outwardly of band segment 203 for location through aperture 202 in the inner band segment 62 and outer band 54 in use. A channel is defined in sleeve member 212 for the location of part of the sensor 201 there-through in use. Sleeve member 212 has a first open end 214 and a second open end 216 and the tip 218 of sensor 201 passes through said openings to protrude inwardly of a channel defined by the two items being joined together in use. An inner surface defining the sleeve member channel is provided with a screw threaded arrangement 220 to allow detachable attachment of sensor 201 via a complementary screw threaded arrangement 222 provided on an exterior surface of sensor 201. A nut or head portion 224 is provided on the sensor 201 to allow the sensor to be screwed into position in the channel of the sleeve member 212 in use. A skirt portion 226 is provided on an exterior surface of sleeve member 212 adjacent second open end 216. This skirt portion 226 is of such dimensions or width so as be larger than the dimensions or width of apertures 202 in band segment 62 and outer band 54, thereby preventing the sensor location socket 210 from passing all the way through apertures 202 in use.

FIG. 4e illustrates a cross sectional view of the clamping band 200 and temperature sensor 201 taken along the line X-X in FIG. 4d. The tip 218 of the temperature sensor 201 protrudes outwardly of the inwardly facing surface of additional band member 203.

FIGS. 7a and 7b show how the clamping band 200 could be supplied with the additional band member 203 and the sensor location socket 210 in an assembled state therewith. Sealing means in the form of sealing gaskets 234 can be provided between the external walls of the sensor location socket 210 and the inner surface of band segment 62 in use.

FIG. 8 shows the clamping band 200 fitted to the two ends of an inlet pipe 236 and an outlet pipe 238. The free ends 240, 242 of the pipes 236, 238 respectively are outwardly flared. In this arrangement, the additional inner band member 203 is located between the free ends 240, 242 of the two pipes so at least parts of the sides of the inner band member 203 protrude inwardly of the pipes. Flat sealing gaskets 234 are located between the outwardly facing surface of the inner band member 203 and the inwardly facing surface of the pipes 236, 238. The inwardly facing surface of inner segment 62 is in contact with the outwardly facing surface of the pipes 236, 238. Thus, clamping band 200 clamps the band members and segments 54, 62 with the pipe ends, the inner band member 203 and the gaskets 234. In this arrangement, it is noted that the outer surface of the inner band member 203 adjacent the socket 210 is angled or at an acute angle with respect to the socket 210. This allows a flat gasket 234 to be provided between the outwardly facing surface of the inner band member 203 and the inwardly facing surface of the pipe ends.

It is to be noted that the inner band member 203 will be fitted to the pipe or filter ends being joined together prior to the clamping band being located over the inner band member and pipe ends to clamp the arrangement together in the illustrated examples.

The invention claimed is:

1. Clamping apparatus, said clamping apparatus including clamping means for clamping two or more items together in use, said clamping means including at least one outer or outermost band or strap member that is annular or substantially annular in form; and at least, one additional inner or innermost band or strap member, or band or strap segment, that is arranged to be in overlapping relationship with the at least one outer or outermost band or strap member in use; the outer or outermost band or strap member arranged to move between a clamped position and an unclamped position in use, and wherein attachment means are provided on or associated with the clamping means for attaching one or more components to said clamping means in use, said components, consisting of any or any combination of one or more sensor means, one or more dispensing means or one or more electronic components, the attachment means are provided on or associated with at least one additional band or strap member, or band or strap segment, and said attachment means includes component location means, socket or sleeve member that protrudes outwardly from an outer or outwardly facing surface of the at least one additional inner or innermost band or strap member, or band or strap segment in use.

2. Clamping apparatus according to claim 1 wherein the at least one outer or outermost band member and/or additional inner or innermost band or strap member, or band or strap segment is profiled, has one or more angled surfaces when viewed in cross section, is V-shaped or substantially V-shaped in cross section or is U-shaped or substantially U-shaped in cross section.

3. Clamping apparatus according to claim 1 wherein the additional inner r innermost band or strap member is continuous or substantially continuous inform.

4. Clamping apparatus according to claim 1 wherein attachment means are also provided on or associated with the at least one outer or outermost band or strap member.

5. Clamping apparatus according to claim 1 wherein the location and/or removal of the one or more components with the clamping apparatus can be undertaken independently of clamping of the clamping apparatus with the two or more items in use, and/or wherein the at least one additional inner or innermost band or strap member, or hand or strap segment, is arranged so as to be located with the two items being clamped independently of or separately to the at least one outer or outermost band or strap member.

6. Clamping apparatus according to claim 1 wherein the attachment means are provided on or associated with the additional, inner or innermost band member, the band or strap segment and/or the at least one outer or outermost band member a spaced distance apart from one or more peripheral or side edges, or all peripheral or side edges, thereof, and/or a spaced distance from one or more ends or opposing ends of the same.

7. Clamping apparatus according to claim 1 wherein the attachment means includes first attachment means for attaching the component location member to the at least one additional inner or innermost band or strap member, the band or strap segment and/or the at least one outer or outermost band member; and second attachment means for attaching the one or more components to the component location member.

8. Clamping apparatus according to claim 1 wherein the socket or sleeve member has a channel defined therein or therethrough, and wherein an interior surface of the socket or sleeve member channel is provided with screw threads for engaging with complementary screw threads provided on an external surface of the component and/or second attachment means.

9. Clamping apparatus according to claim 1 wherein the component location member, socket or sleeve member has a first part or end that is larger in dimensions than a second part or end, thereby allowing the second part or end to pass through an aperture defined in the at least one additional inner or innermost band or strap member, band or strap segment and/or at least one outer or outermost band member in use but prevent the first part or end from passing through the aperture in use.

10. Clamping apparatus according to claim 1 wherein securing means are provided on or associated with the at least one outer or outermost band or strap member for maintaining the same in the clamped and/or unclamped positions in use and/or adjusting the clamping force applied by the same in use.

11. Clamping apparatus according to claim 1 wherein sealing means are provided on or associated with the clamping apparatus for forming a seal between the one or more components, the at least one outer or outermost band or strap member, the at least one additional inner or innermost band or strap member, or band, or strap segment and/or the one or more items in use.

12. Clamping apparatus according to claim 1 wherein the one or more sensors means includes any or any combination of one or more pressure sensors, temperature sensors, nitrogen oxide sensors, oxygen sensors, lambda sensors or diesel particulate sensors; the dispensing means includes an injection device or urea injection device; and/or the one or more electronic components include one or more heating devices or heating elements.

13. Clamping apparatus according to claim 1 wherein the one or more items being joined together by the clamping means include any or any combination of one or more conduits, flared end conduits, flat end conduits, pipes, hoses, filter sections, exhaust gas pipe sections or cans.

14. Clamping apparatus according to claim 1 wherein closure means are provided to close an opening associated with the attachment means when the attachment means are not in use.

15. A method of using clamping apparatus, said clamping apparatus including clamping means, said clamping means including at least one outer or outermost band or strap member that is annular or substantially annular in form; and at least one additional inner or innermost band or strap member, or band or strap segment, that is arranged to be in overlapping relationship with the at least one outer or outermost band or strap member in use; and said method including the steps of locating said clamp means around two or more items that need to be clamped together, moving said at least one outer or outermost band or strap member from an unclamped position to a clamped position, attaching one or more components to said clamping means using attachment means, wherein said components consist of any or any combination of one or more sensor means, one or more dispensing means or one or more electronic components, wherein the attachment means are provided on or associated with at least an additional band or strap member, or band or strap segment, and said attachment means includes component location means, socket or sleeve member that protrudes outwardly from an outer or outwardly facing surface of the at least one additional inner or innermost band or strap member, or band or strap segment in use.

* * * * *